Patented Jan. 3, 1939

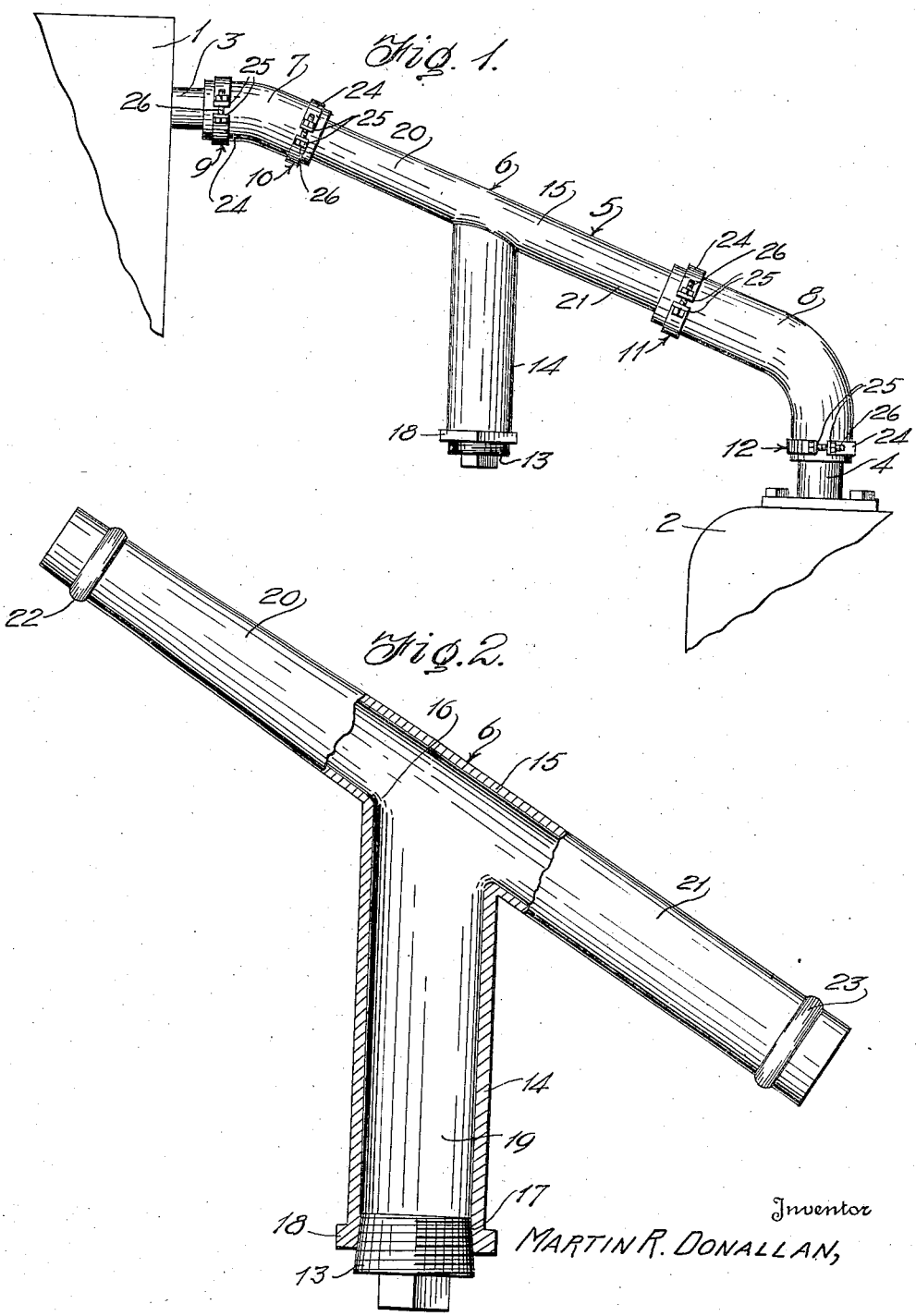

2,142,888

UNITED STATES PATENT OFFICE 2,142,888

SEDIMENT TRAP STRUCTURE FOR COOLING SYSTEMS OF AUTOMOTIVE VEHICLES

Martin R. Donnallan, West Point, Calif.

Application August 30, 1937, Serial No. 161,708

4 Claims. (Cl. 210—57)

This invention relates to the cooling system of the engines of automotive vehicles, but more particularly to a sediment trap structure for interposition in the upper run of the cooling medium circulation line, and has for its object to provide, in a manner as hereinafter set forth a structure of the type referred to for trapping foreign matter in the cooling medium as the latter travels from the engine block to the radiator thereby preventing such matter entering the latter and impairing the function of the cooling system, which otherwise would result in the heating of the engine due to poor circulation caused by such matter being conducted into the radiator during the operation of the engine.

As is well known that scum, such as rust, scale and small particles of rubber leave the engine or motor and are caused by the water pump to be conducted through the upper run or stretch of the water circulating line into the top of the honey-combs of the radiator. Solutions are employed to remove the scum when circulation is poor and the engine is heating and which is not satisfactory. Then further radiators must be taken off occasionally and boiled out. Circulation is then reversed and the radiator is pumped out, or blown out by air or steam. The cleaning of radiators in the manner as aforesaid to insure a satisfactory circulation of the cooling medium is objectionable especially when the radiator is removed, as it requires considerable time and labor, as well as preventing, when the radiator is removed the use of the vehicle with which the radiator is associated. To overcome the foregoing objections is the aim of this invention and to this end the invention resides in the provision of a sediments trap structure so constructed and so arranged with respect to the cooling medium circulating line to trap the sediment of the cooling medium during the travel of the latter towards the radiator whereby circulation is kept free, heating of the engine is reduced to a minimum and materially reducing the length of the hose connection between the engine block and the radiator, as such connection deteriorates and particles thereof not only clog it and the honey-combs of the radiator resulting in poor circulation.

Further objects of the invention are to provide in a manner as hereinafter set forth a sediment trap structure for interposition in a cooling medium circulating line which is simple in its construction and arrangement, strong, durable, compact, readily installed with respect to the line, thoroughly efficient in its use, conveniently cleaned when occasion requires without removing it from its installed position, and inexpensive to manufacture.

To the above ends essentially and to others which may hereinafter appear, the invention consists of the novel construction, combination and arrangement of parts as will be more specifically described and as illustrated in the accompanying drawing wherein is shown an embodiment of the invention, but it is to be understood that changes, variations and modifications may be resorted to which fall within the scope of the invention as claimed.

In the drawing:—

Figure 1 is a side elevation of the sediment trap structure showing the installation thereof with respect to the radiator and engine block of an automotive vehicle, and Figure 2 is a view looking towards one side of the sediment trap structure partly in side elevation and partly in vertical section.

With reference to the drawing, 1 indicates the radiator and 2 the engine block of an automotive vehicle and which are provided respectively with an intake 3 and an outlet 4 for the cooling medium.

The sediment trap structure 5 has parts thereof to be referred to, which in connection with the intake 3 and outlet 4 provide the upper run or stretch of the cooling medium circulating line.

The structure 5 includes a trap element 6, a pair of tubular bendable sleeves 7, 8, a pair of clamps 9, 10 associated with the sleeve 7, a pair of clamps 11, 12 associated with the sleeve 8, and a removable closure 13 for element 6. The sleeves 7, 8 preferably will be formed of lengths of rubber tubing, but it is to be understood that the sleeves may be formed of any suitable material. Preferably the sleeve 7 will be of less length than sleeve 8, and is so shown. The element 6 consists of a casting formed of a vertical tubular branch 14 and an upper tubular branch 15 disposed at an inclination to the horizontal. The inner and outer diameters of the branch 14 are greater than that of branch 15. The latter centrally of the bottom is formed with an enlarged circular opening 16. The branch 14 opens into and is integral at its upper end with the branch 15. The inner face of branch 14 forms a flush continuation of the wall of opening 16. The lower portion of the inner face of branch 14 is tapered, as at 17. The lower end of branch 14 is provided with an annular peripheral flange 18. The branch 14 provides a sediment trap 19 or rather a trap for the foreign matter conducted by the cooling medium when the latter travels from block 2 to radiator 1. The mouth of trap 19 is provided by the upper end of branch 14. The lower end of trap 19 is closed by the removable tapered plug 13 threadedly engaging with the portion 17 of the inner face of branch 14. The said portion 17 and the plug 13 may be plain or threaded, preferably threaded and are so shown. The plug 13 forms a removable bottom for trap 19.

The branch 15 is of greater length than branch 14 and it is formed of the portions 20, 21 of like length merging into each other at their inner ends. The portion 20 extends from and is disposed throughout at an upward inclination with respect to the upper end of branch 14. The portion 21 extends from and is disposed throughout at a downward inclination throughout with respect to the upper end of branch 14. The portion 20 gradually decreases in inner and outer diameter from its inner to its outer end. The portion 21 is of greater inner and outer diameters than that of portion 20. The outer diameter of portion 21 is uniform. The inner diameter of portion 21 is uniform. The portion 20 in proximity to its outer or upper end is formed with an annular boss 22 on its outer periphery. The portion 21 in proximity to its outer or lower end is provided with an annular boss 23 on its outer periphery.

The clamps are of like form and each consists of a split band 24 formed at its ends with angularly disposed parallel apertured lugs 25 through which extend an adjustable holdfast means 26 acting on the band 24 to tighten it in position to provide for the activity of the clamp.

The intake 3 extends into the inner or upper end and the upper or outer end of portion 20 of branch 15 extends into the outer or lower end of the sleeve 7 to beyond the boss 22. The clamp 9 is employed for clamping intake 3 and sleeve 7 together. The clamp 10 is employed for clamping sleeve 7 and portion 20 together. The clamp 10 is positioned on sleeve 7 at a point inwardly of boss 23.

The outlet 4 extends into the outer or lower end and the portion 21 extends at its lower or outer end into the upper or inner end of the sleeve 8 to beyond the boss 23. The clamp 11 is employed for clamping portion 21 and sleeve 8 together. The clamp 11 is positioned on sleeve 8 at a point above the boss 23. The clamp 12 is employed for clamping outlet 4 and sleeve 8 together.

The branch 15, sleeves 7, 8 intake 3 and outlet 4 provide what may be termed the upper run or stretch of the cooling medium circulating means which conducts the cooling medium from the engine block to the radiator. The said upper run or stretch is so related to the trap 19 whereby as the cooling medium travels upwardly towards the radiator the foreign matter carried by said medium will fall by gravity into trap 19 before such matter can enter the radiator.

As plug 13 is removable, a provision is had for emptying the trap 19 when occasion requires.

What I claim is:—

1. In a sediment trap structure for interposition in the cooling medium circulating means for the engine of an automotive vehicle, a tubular casting formed of upper and lower branches disposed in angular relation, said lower branch opening at one end into the upper branch at the bottom of the latter, said upper branch forming a part of the upper stretch or run of the cooling medium circulating means and adapted to be connected at one end with the radiator of the engine and at its other end with the cooling medium circulating pump, said upper branch being disposed at an inclination to the horizontal and being of uniform inner diameter from its lower end to its transverse center and having its inner diameter gradually decreasing from its traverse center to the upper end, said lower branch being vertical, and a removable closure means for, positioned within, depending from and detachably connecting with the lower terminal portion of the inner face of said lower branch and providing in connection with the latter a trap.

2. In a sediment trap structure for interposition in the cooling medium circulating means for the engine of an automotive vehicle, a tubular casting formed of upper and lower branches disposed in angular relation, said lower branch being vertically disposed, opening at its upper end into the bottom of the upper branch intermediate the ends of the latter, said lower branch being of uniform diameter throughout and of greater diameter than said upper branch, said upper branch adapted to have one end connected with the radiator of the engine and its other end with the cooling medium circulating pump and forming a part of the upper stretch or run of the cooling medium circulating means, said upper branch having its inner diameter gradually decreasing from its transverse median to that end thereof for connection with the radiator, and a removable closure means for, positioned within, and detachably connecting with the lower terminal portion of the inner face of the lower branch and forming in connection with the latter a trap.

3. In a sediment trap structure for interposition in the cooling medium circulating means for the engine of an automotive vehicle, a tubular casting formed of upper and lower branches disposed in angular relation, said lower branch being vertically disposed and opening at its upper end into the bottom of the upper branch intermediate the ends of the latter, said upper branch adapted to have one end connected with the radiator of the engine and its other end with the cooling medium circulating pump and forming a part of the upper stretch or run of the cooling medium circulating means, and a plug extending into and detachably connecting with the lower terminal portion of the inner face of the lower branch for closing the latter and providing in connection with said lower branch a trap, said upper branch having its inner diameter gradually decreasing from the open upper end of the lower branch to that end of the upper branch connected with the radiator.

4. In a sediment trap structure for interposition in the cooling medium circulating means for the engine of an automotive vehicle, a tubular casting formed of upper and lower branches disposed in angular relation, said lower branch being vertically disposed and opening at its upper end in the bottom of the upper branch intermediate the ends of the latter, said upper branch adapted to have one end connected with the radiator of the engine and its other end with the cooling medium circulating pump and forming a part of the upper stretch or run of the cooling medium circulating means, and a plug extending into and detachably connecting with the lower terminal portion of the inner face of the lower branch for closing the latter and providing in connection with said lower branch a trap, said uper branch having its inner diameter gradually decreasing from the open upper end of the lower branch to that end of the upper branch connected with the radiator, said upper branch being provided inwardly adjacent to each of its ends with an annular boss on its outer periphery.

MARTIN R. DONNALLAN.